United States Patent [19]

Lederman

[11] Patent Number: 5,387,041
[45] Date of Patent: Feb. 7, 1995

[54] CLOSE PACKED PLASTIC BEARING BALL SEPARATOR

[75] Inventor: Frederick E. Lederman, Sandusky, Ohio

[73] Assignee: General Motors Corporation, Detroit, Mich.

[21] Appl. No.: 236,318

[22] Filed: May 2, 1994

[51] Int. Cl.$^6$ .................... F16C 33/38; F16C 33/44
[52] U.S. Cl. .................... 384/531; 384/526; 384/527
[58] Field of Search ............ 384/523, 526, 527, 531, 384/532, 533, 534

[56] References Cited

U.S. PATENT DOCUMENTS

| | | | |
|---|---|---|---|
| 1,017,480 | 2/1912 | Straub | 384/532 |
| 1,203,928 | 11/1916 | Starin . | |
| 3,397,019 | 8/1968 | Day et al. | 384/526 |
| 3,624,815 | 11/1971 | Schweitzer | 384/533 |
| 4,330,160 | 5/1982 | Stolz et al. | 384/531 |
| 4,560,291 | 12/1985 | Bonengel et al. | 384/533 |
| 4,702,627 | 10/1987 | Pollastro | 384/526 |
| 4,804,276 | 2/1989 | Olschewski et al. | 384/526 |
| 4,938,613 | 7/1990 | Griffin et al. | 384/526 |

Primary Examiner—Thomas R. Hannon
Attorney, Agent, or Firm—Patrick M. Griffin

[57] ABSTRACT

A design for a plastic bearing ball separator is moldable by a true, axial draw technique, which provides no resistance to mold parting, but which also provides complete, gripping ball pockets without limiting the degree to which the ball row can be closely packed. Each ball is gripped between a pair of hook shaped fingers which have ball contact zones facing in one direction, and a ball seat between them that faces in the opposite direction. The ball contact zones touch one side of the ball, and since the fingers wrap around the ball in such a way as to miss the centers of the balls, the ball packing or spacing is not restricted. The ball seats touch the other side of the balls, and have no circumferential overlap with the ball contact zones, so the cage may be molded by molds that form the oppositely axially facing surfaces without conflict, and without restriction as the molds are parted. Axially running notches bordering the ball seats allow the ball seats to have some radial overlap with the pair of ball contact zones that they face, so the ball is securely gripped.

3 Claims, 7 Drawing Sheets

CLOSE PACKED PLASTIC BEARING BALL SEPARATOR

This invention relates to close packed bearing ball separators in general, and specifically to such a separator that can by pass molded from plastic material.

BACKGROUND OF THE INVENTION

Ball bearings for automotive applications may be found in both low speed applications, such as above the spring seat in a McPherson type strut, or in high speed applications, such as wheel bearings. While low speed bearings can tolerate a ball row with no cage to keep the balls from colliding, high speed ball bearings require some kind of cage type separator. In the case of a high speed bearing where the load requirements do not require a very close ball spacing or packing, there is significant room between adjacent ball pairs. In such a case, it is relatively easy to provide a molded plastic bearing cage. Structural elements of the plastic cage, such as relatively thick fingers or cross bars, pass between the balls in the room available. Examples of these may be seen in U.S. Pat. No. 4,330,160, which shows a closed ball pocket that completely encircles a ball, and co assigned U.S. Pat. No. 4,938,613, which shows an open pocket that securely retains, but does not completely encircle, a ball. Each patent also discloses a design that can be by pass molded, sometimes called axial draw molding. This is a molding method in which only two, axially parting molds create all molded surfaces. In U.S. Pat. No. 4,330,160, the moldability of the design has the drawback of creating ball contact surfaces in the pocket that would not securely hold the ball apart from the bearing assembly, which could limit ease of assembly.

In the case of bearings that require a very close ball packing, a different retainer design is needed, one that does not occupy space between adjacent balls. Typically, such cages, which may be referred to as open profile cages, are made from stamped and folded metal. An example may be seen in U.S. Pat. No. 1,203,928. In an open profile cage, the space between the balls is left open by separating the balls with fingers that extend out axially from an annular spine to wrap partially around the balls, keeping them apart, but which do not block the closest spacing between the balls. Stated differently, the closest spacing between the balls is along the chord length of the balls, that is, a straight line running from one ball center to the adjacent ball center. In a true, open profile cage, no solid part of the cage is encountered moving along the chord length of the balls, allowing them to be spaced as closely as possible. Of course, as a practical matter, there will have to be some space between the balls to prevent ball to ball rubbing, the cage structure is not a limiting factor.

It is a relatively simple matter to make an open profile cage from metal, as the high strength of metal allows for very thin fingers and spines, and the metal folding and bending technology is well developed. It would not be possible to simply replicate such old metal designs in plastic, however. The much weaker plastic material would require much thicker cross sections for the spine and fingers, and the folded metal designs often are too complex to be molded by the axial draw method described. U.S. Pat. No. 4,702,627 attempts to provide a molded plastic cage that allows for a close packed ball row. However, as seen in FIG. 8 of the patent, which shows a cross section of the cage as seen moving along the chord length, a solid web of material is encountered. Therefore, the cage cannot be considered a true open profile design. It would inherently limit the closeness of the ball packing, especially in the thick sections needed with plastic. Also, the design shown would clearly not be moldable by simply axially parting two molds, at least not without stressing certain elements of the cage. As seen in 2 of the patent, the ball pocket is provided, for each ball, by two fingers 9 that wrap or hug one side of the ball, and a semi spherical seat 8 that contacts the opposite side of the ball. The fingers 9 lie partially over the seat 8, so the mold element that created the seat 8 would have to be bend the fingers 9 out of the way as the molds parted. This is feasible, since the fingers 9 have room to flex, but it is not true, stress free axial draw molding.

SUMMARY OF THE INVENTION

The invention provides a plastic cage of true open profile type that does not limit the closeness of the ball pack, has a novel design that can be by pass molded, and which provides for good ball control during bearing operation.

In the preferred embodiment disclosed, the cage is comprised of an annular spine and a plurality of axially extending, generally hook shaped fingers. The fingers have side surfaces extending along the sides of the hook that are partially cylindrical, and run parallel to the axis of the annular spine. Each finger wraps around, but does not intersect, the chord length line running between adjacent ball centers. The two partially cylindrical side surfaces of the finger themselves intersect at the base of the hook to create a semi spherical ball contact zone that lies on one side of the pitch plane of the balls, that is, a plane that contains the ball row centers and is perpendicular to the cage axis. The ball contact zones of adjacent fingers lie on a sphere that will contact the outside of a ball. Between each pair of adjacent fingers is a semi spherical ball seat molded integrally to the to cage spine which lies on the other side of the pitch plane, opposed to the ball contact zones of the adjacent fingers, but lying on the same spherical surface. A pair of clearance notches running parallel to the cage axis border each ball seat, circumferentially aligned with the ball contact zones of the fingers, separating each ball seat from the fingers that border it and thereby preventing any part of the ball contact zones of the fingers from overlying the ball seats. Therefore, the cage can be by pass molded, with no withdrawal resistance from any part of the cage as the mold halves part. Furthermore, after the balls have been resiliently snapped between the fingers and respective balls seats, there is no cage material lying along the chord length between the balls, giving a true, non limiting, open profile configuration.

DESCRIPTION OF THE PREFERRED EMBODIMENT

These and other features of the invention will appear from the following written description, and from the drawings, in which.

Figure 1:
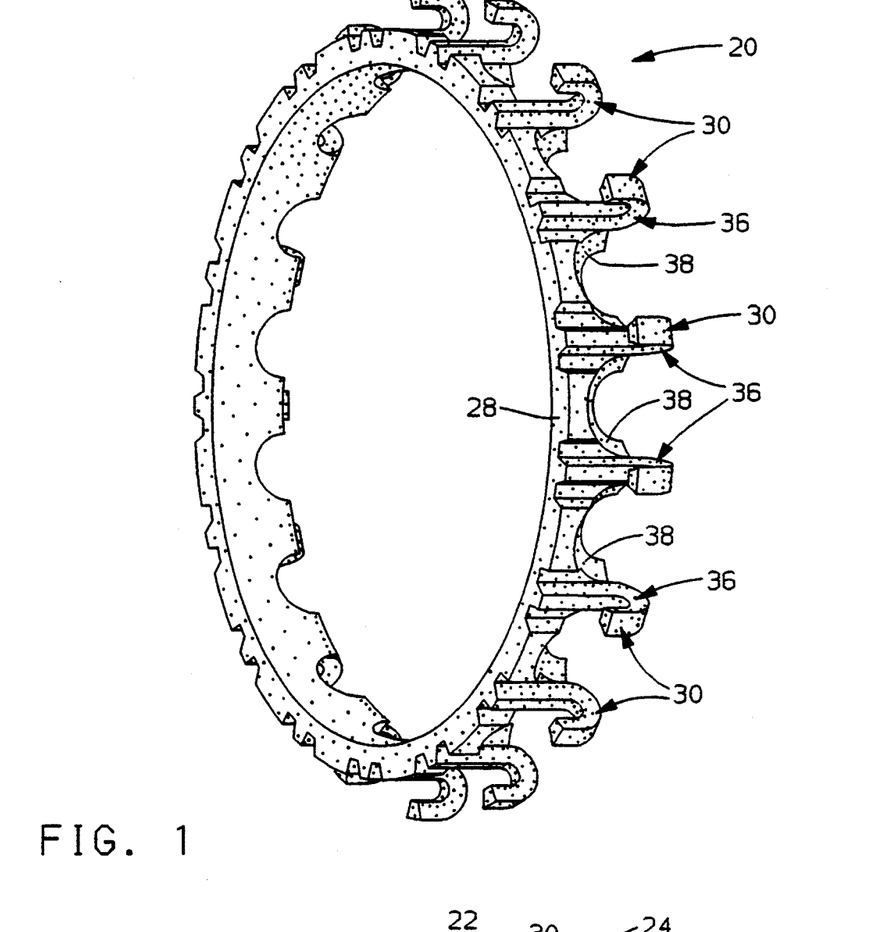
FIG. 1 is a perspective view of a cage made according to the invention.
Figure 2:
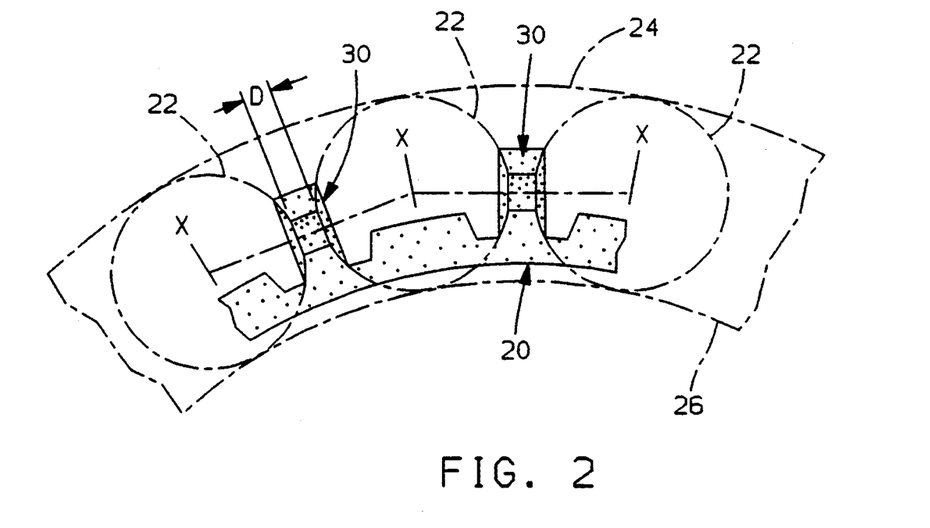
FIG. 2 is a view looking in one axial direction at the cage, showing the balls and pathways in dotted lines, and illustrating the cord length between adjacent balls.
Figure 3:
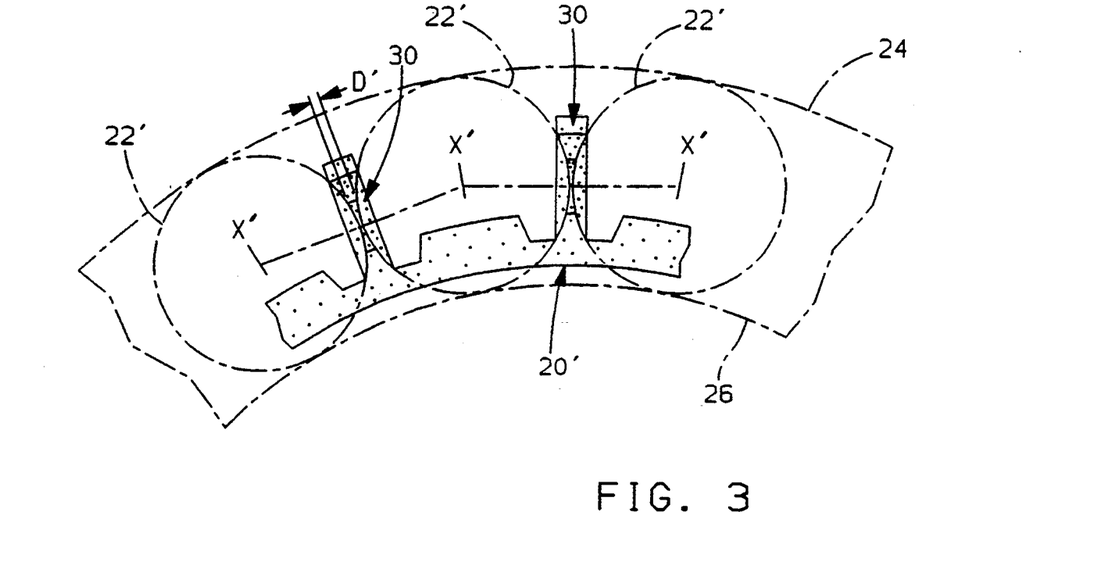
FIG. 3 is a view like FIG. 2, but illustrating the cord length possible in an alternative embodiment with a closer ball packing.
Figure 4:
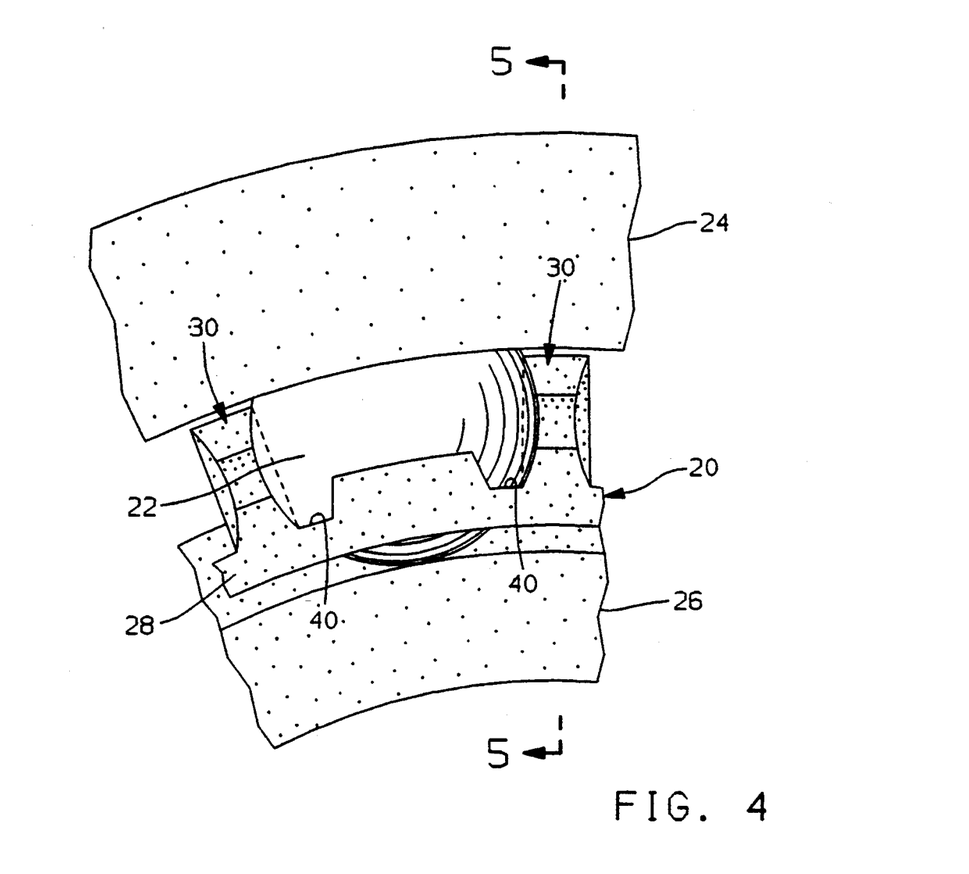
FIG. 4 is a view looking axially into a portion of a bearing with the cage of the invention.
Figure 5:
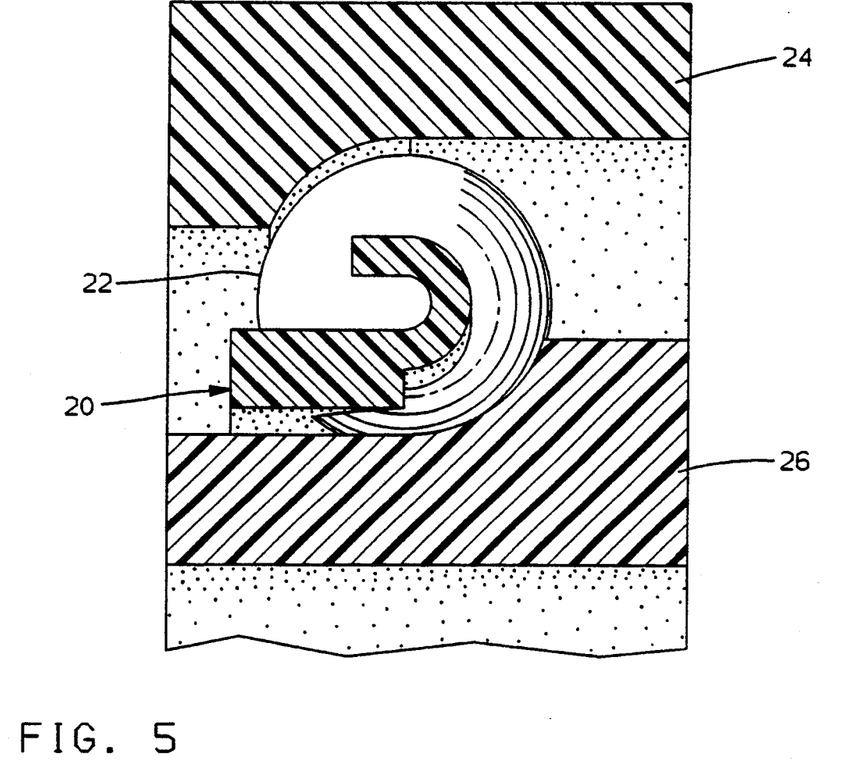
FIG. 5 is a cross section of the bearing of FIG. 4 taken along the line 5—5 of FIG. 4.
Figure 6:
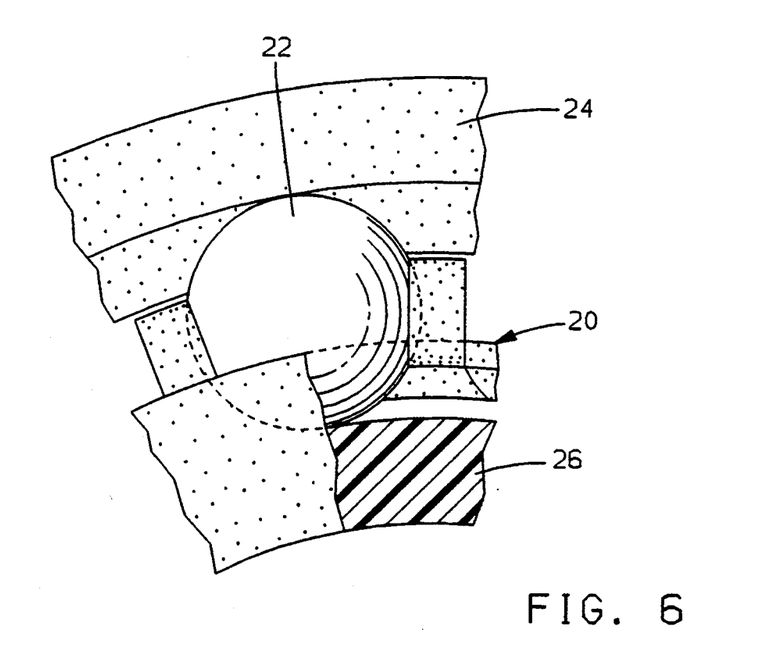
FIG. 6 is a view like FIG. 4 looking in the other axial direction.

Referring first to FIGS. 1 through 6, a preferred embodiment of the molded plastic separator or cage of the invention, indicated generally at 20, is used to separate a row of eighteen bearing balls 22 that run between a pair of angular contact bearing races 24 and 26. As will be readily understood by those skilled in the bearing art, the races 24 and 26, as shown, would need additional structure to prevent them from axially separating, since neither is shown as having a full contact ball pathway. However, the present invention relates only to cage 20. Cage 20 is integrally injection molded of a suitable plastic material, such as nylon, by a technique described in more detail below. Without going into the exact details that allow cage 20 to be so molded, an important basic feature of cage 20 is apparent from FIGS. 2 and 3. The most significant characteristic of the complement of bearing balls 22 is not their absolute number, but how closely they are packed. The closeness of packing is best illustrated by reference to the chord length between adjacent balls 22. The various ball center to ball center chords, the lines x—x in FIG. 2, inscribe a regular polygon within the pitch circle of the balls 22. Moving along the chord lengths, no material of cage 20 is encountered. Consequently, the spacing of the adjacent balls 22 is not limited, and cage 20 can be considered a true open profile cage. In the embodiment shown in FIG. 2, there is in fact a significant spacing D between the balls 22. However, that spacing is a result not of limitations imposed by the structure of cage 20, but is instead inherent from the division of the diameter of the particular balls 22 into the ball pitch circle that exists. Ball diameter cannot always be optimized to available pitch circle, since standard ball sizes have to be used. In FIG. 3, an alternate embodiment of theoretically larger diameter balls 22' is shown, with a consequently smaller ball spacing D', which is as small as possible while still preventing ball collision. A different embodiment of cage, indicated at 20', accommodates the balls 22' with no qualitative change, only a lesser thickness of substructures described in detail below.

Figure 7:
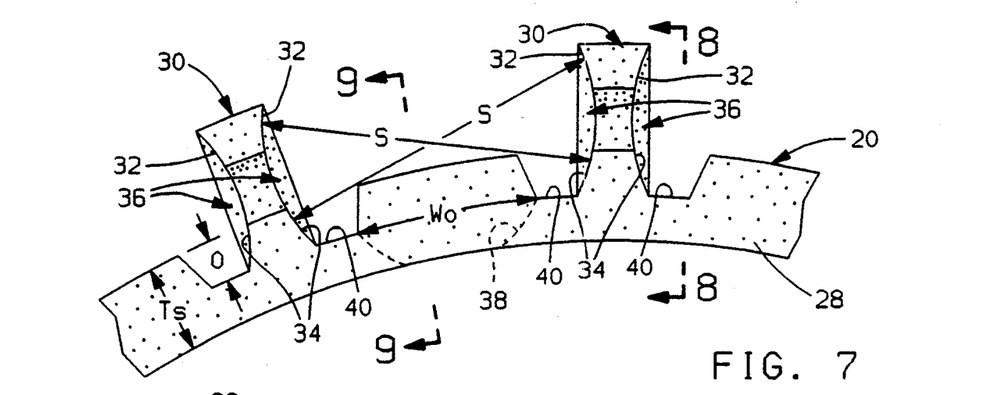
FIG. 7 is view of just the portion of the bearing cage shown in FIG. 4.
Figure 8:
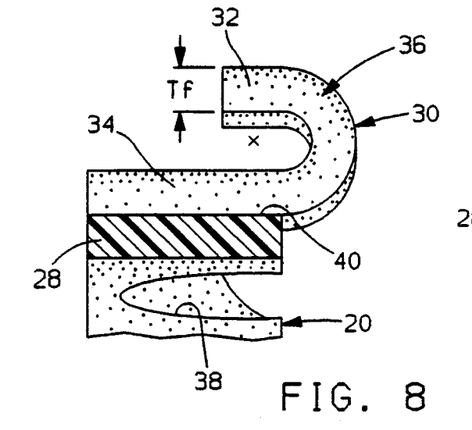
FIG. 8 is a cross section of the bearing cage taken along the line 8—8 of FIG. 7.
Figure 9:
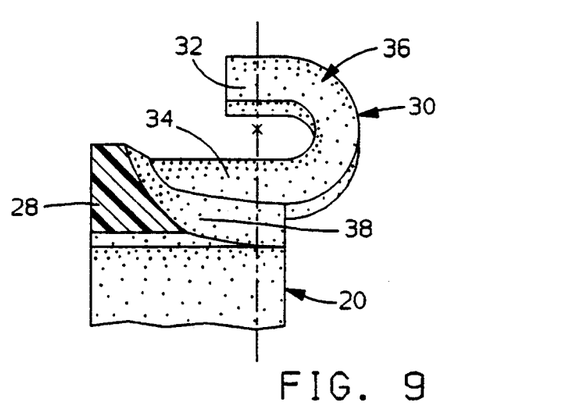
FIG. 9 is a cross section of the bearing cage taken along the line 9—9 of FIG. 7.

Referring next to FIGS. 7 through 9, the basic structure of cage 20 consists of an annular spine 28 from which extend seventeen evenly spaced hook shaped fingers 30, evenly spaced in pairs with an inside spacing generally equal to the diameter of a ball 22, and a radial thickness $T_f$. More specifically, each finger 30 has a pair of semi cylindrical side surfaces 32 and 34 that extend parallel to the central axis of the annular spine 28, and which slope in opposite radial directions toward one another, as best seen in FIG. 7. The diagonal separation S between the side surfaces 32 and 34 of adjacent fingers 30 is approximately equal to the diameter of a ball 22, which serves a purpose described below. The two side surfaces 32 and 34 intersect at the base of the hook shape to create a U shaped, semi spherical ball contact zone that is indicated at 36. Each zone 36 lies on a sphere coextensive with the outer surface of a ball 22. Zone 36 also lies on one side of a plane through the ball pitch circle, shown as a dotted line in FIG. 9, and faces in one axial direction. While the fingers 30 cross and intersect with the pitch plane, in will be noted that they wrap around, but are clear of, the chord length lines described above, and do not cross the location of the ball center, shown by the small x in FIGS. 8 and 9. This is why no solid material is encountered moving between ball centers. Integrally molded to spine 28 evenly between each pair of adjacent fingers 30 is a semi spherical ball seat 38 which lies on the same spherical surface as zone 36, but on the opposite side of the pitch plane, and facing in the opposite axial direction. Ball seat 38 has an axial extent that is almost as great as spine 28, a circumferential width Wo that is a significant proportion of the diameter of ball 22, and a radial thickness $T_s$. Bordering each ball seat 38, and separating it circumferentially from the pair of fingers 30 between which it lies, is a pair of parallel clearance notches 40, which also run parallel to the axis of spine 28. Each clearance notch 40 is circumferentially aligned with a respective ball contact zone 36, assuring that there is no circumferential overlap between each ball seat 38 and the finger ball contacts zones 36 that it lies between and axially faces. There is, however, a radial overlap indicated at "O" in FIG. 7 exists between each ball seat 38 and the zones 36 that border it. This very, complex shape of cage 20 allows for a simple manufacture, as well as operation as a true open profile cage.

Figure 11:
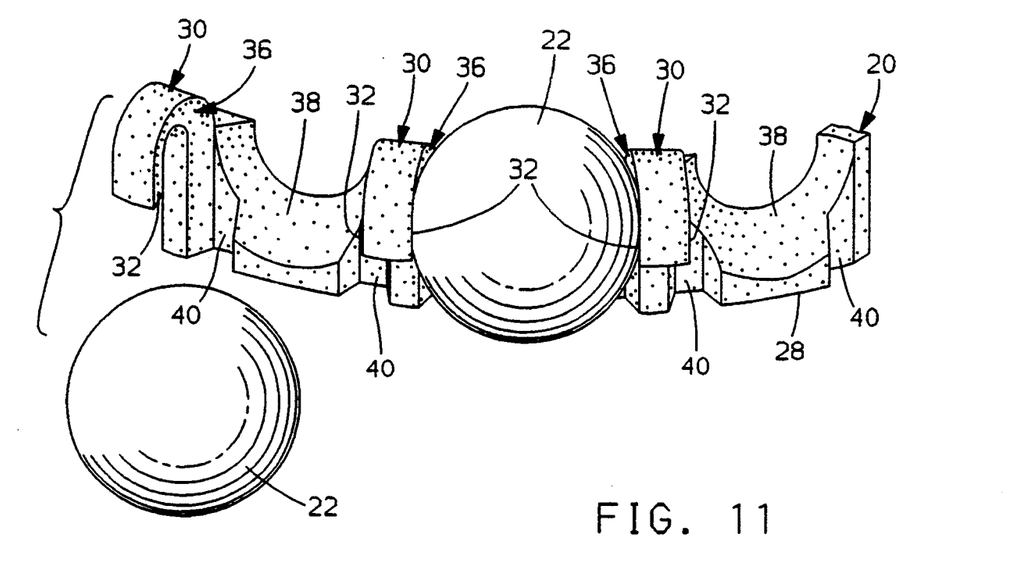
FIG. 11 is a perspective view of part of the cage, showing the manner in which the balls snap into the pockets.
Figure 15:
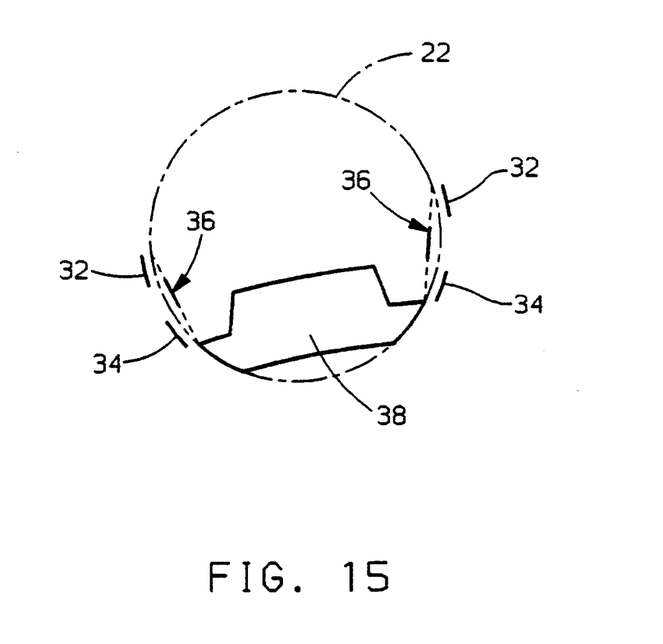
FIG. 15 is a schematic view illustrating the geometry of the ball retention, seen from the same perspective as FIG. 4.

Referring next to FIGS. 11 and 15, the manner in which cage 20 retains the balls 22 is illustrated. Each ball 22 is snapped snugly into a three part pocket created by a ball seat 38 and the two opposed ball contact zones 36 that face it, as seen in FIG. 11. The manner in which a ball 22 is retained may be analogized to a baseball grasped in fork ball fashion, between two hooked fingers overlying the heel of the hand, gripping three opposed points on the ball, which provides stable retention. FIG. 15 shows the three "points" (areas, in fact), indicating a ball 22 in dotted line. The radial overlap allowed by the clearance notches 40 referred to above is also indicated. It is the radial overlap of, in combination with the opposite axial direction of the three points of contact that gives such secure retention. This would allow the cage 20 and balls 22 to be handled as a separate subassembly, if desired. In addition to the three point contact of the zones 36 and seat 38 on each ball 22, the diagonally opposed side surfaces 32 and 34 make a four point contact with the outside of a ball 22 at or near the pitch plane, though the contact is not as extensive and close. This provides a secondary advantage described below.

Figures 10A, 10B, 10C:
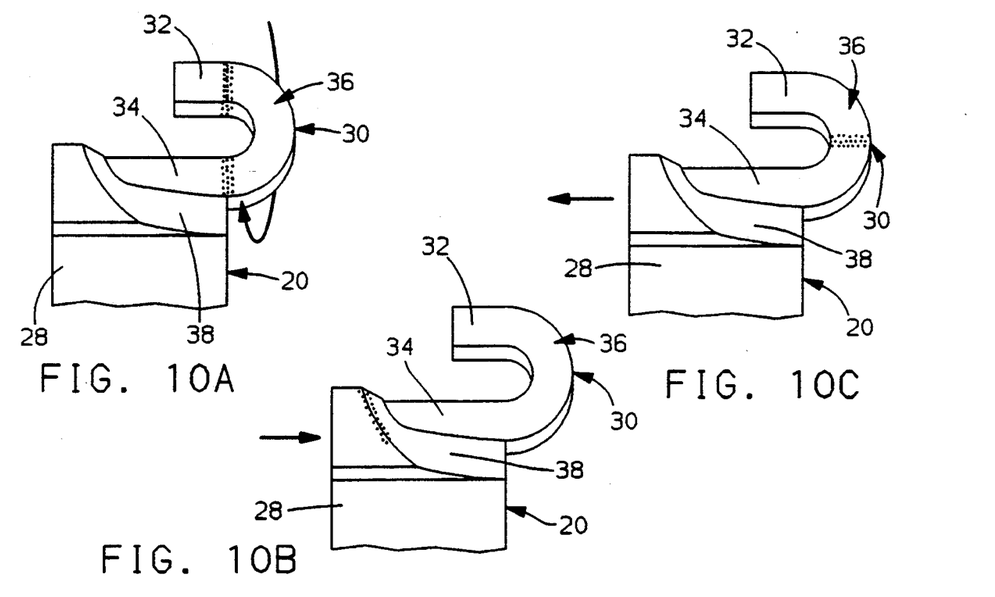
FIG. 10A is a view like FIG. 9, showing the area where the finger side surfaces contact a ball.
FIG. 10B is a view like 10A, but showing the area where the ball seat contacts the ball.
FIG. 10C is a view like 10B, but showing the area where the contact zone of the fingers contact the ball.

Referring to FIGS. 10A, B, C, and 15, it may be seen how, during bearing operation, each and every ball 22 is well controlled and restrained regardless of the direction in which it may be forced. If a pair of adjacent balls 22 are forced circumferentially toward one another, they tend to collide, and squeeze the finger 30 located between them. The adjacent balls 22 are driven into the oppositely sloping finger side surfaces 32 and 34, as shown by the stippling in FIG. 10A. This would tend to open up the hook of the finger 30, but its resistance to flexing open, dependant on the radial thickness $T_f$, is relatively large, keeping the balls 22 apart. However, each finger 30's circumferential thickness, its thickness between adjacent balls 22, is effectively zero. Therefore, as noted above, ball spacing is not limited, even though ball collision is strongly resisted. If a ball 22 is driven in either axial direction, as shown by the arrows in FIGS. 10B and 10C, it is restrained by either a pair of ball contact zones 36, or by a ball seat 38, as indicated by stippling. If a ball 22 spins in a direction out of the pitch plane, it rides in a socket created by the ball seat 38 and two opposed zones 36, which lie on the outer surface of the ball. If it spins in a direction in or close to the pitch plane, shown by the circular arrow in FIG. 10A, it rides in a secondary socket created by the four contact points of the diagonally opposed finger side surfaces 32 and 34, which are labeled in FIGS. 10A and 15. Therefore, no matter in which direction the cage 20 is compressed or stretched by the balls 22, it's cross sections are sufficient to provide adequate strength and resistance, but without limiting the ball spacing. Furthermore, as described in detail below, cage 20 is easily molded.

Figure 12:
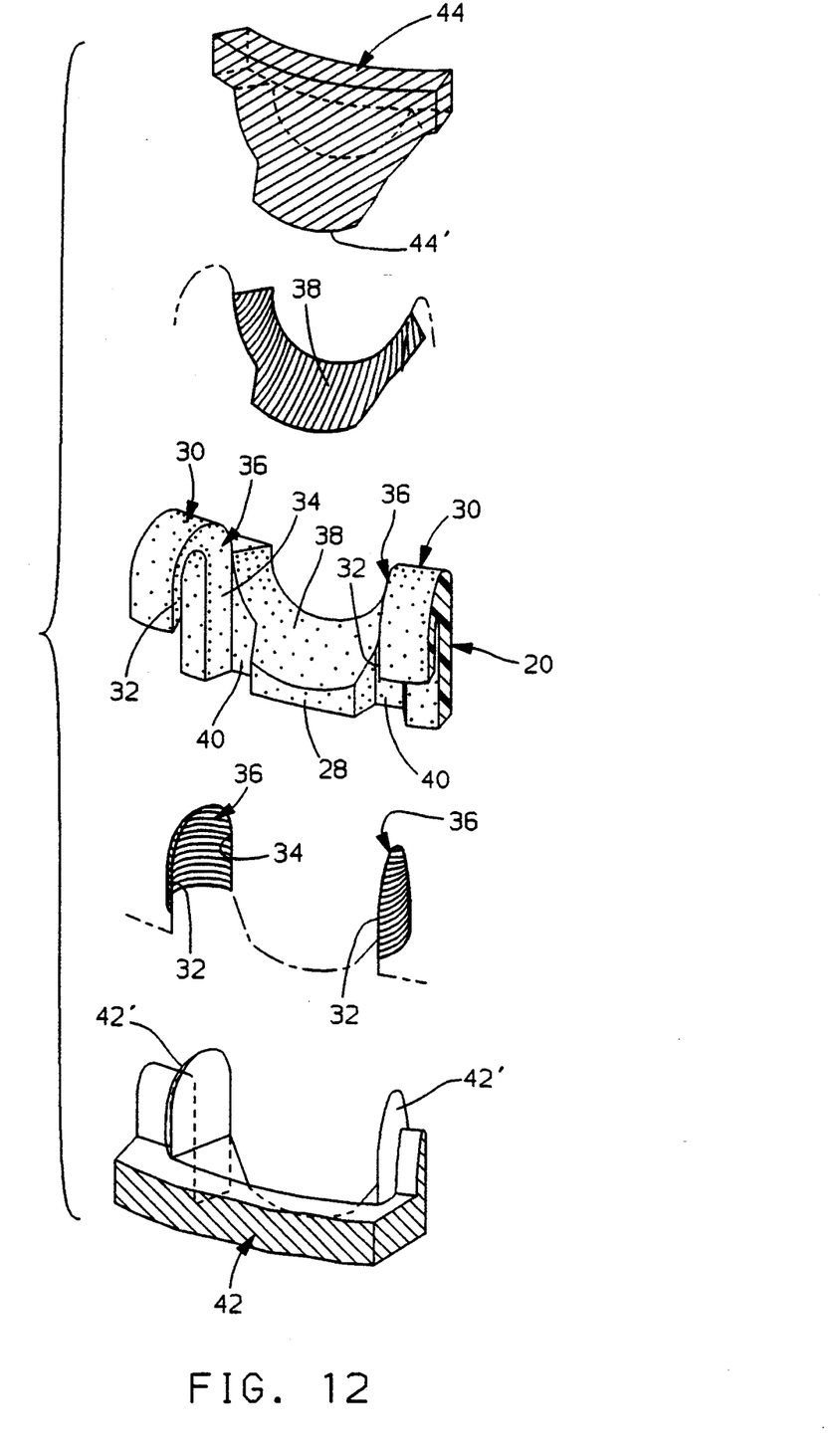
FIG. 12 is a perspective view of the same part of the cage as FIG. 11, showing portions of the two molds that create the ball pocket contact surfaces.
Figure 13:
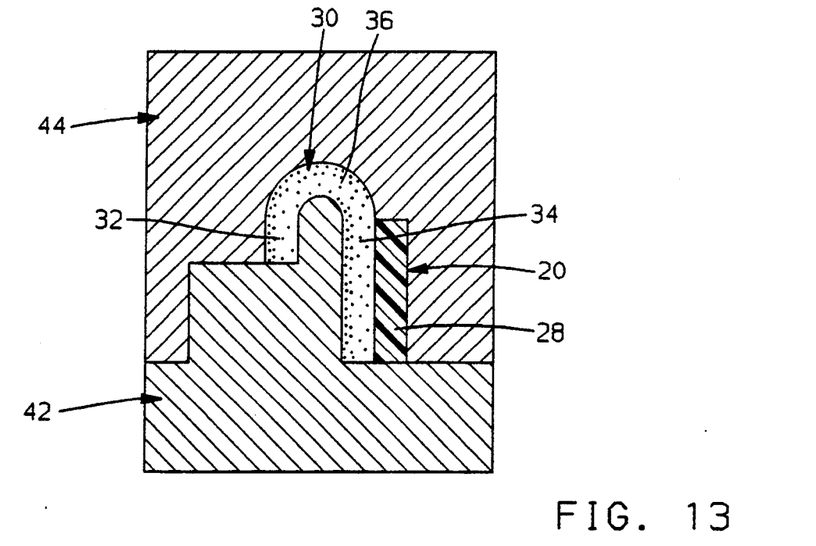
FIG. 13 is a cross section through the same part of the cage as FIG. 8 and also through the closed molds as the cage is being molded.
Figure 14:
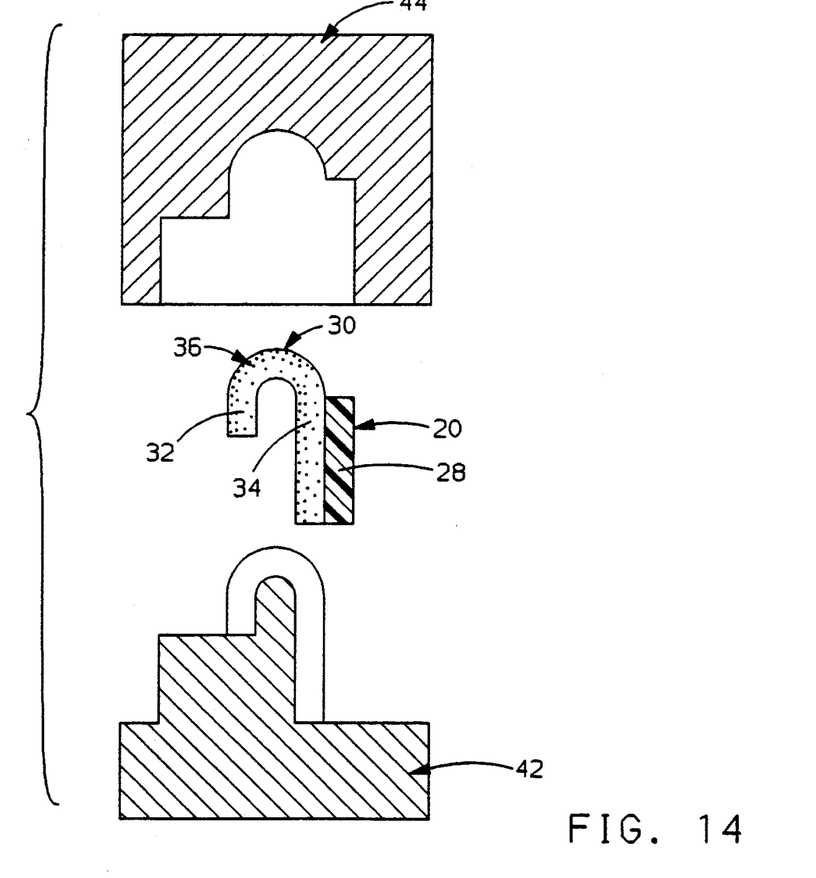
FIG. 14 is a view showing the molds parted.

Referring next to FIGS. 12 through 14, the structural features of cage 20 that allow it to be molded include the spatial relationship of the finger ball contact zones 36 to the ball seats 38. As noted, the clearance notches 40 prevent any part of each ball seat 38 from overlapping circumferentially with the pair of oppositely facing zones 36 that border it, while still creating the radial overlap that allows for good ball retention. The same lack of circumferential overlap applies to all other surfaces of cage 20 that have a component parallel to the pitch plane of cage 20. For example, the outer and inner surfaces of the fingers 30 also do not overlay any other surface of cage spine 28. Furthermore, those surfaces of cage 20 that do inherently overlay one another, such as the inner and outer curved surfaces of the fingers 30, are joined by surfaces, such as the finger side surfaces 32 and 34, that extend parallel to the central axis of cage 20. This combination of features allows cage 20 to be injection molded in the cavity formed between only two molds, indicated generally at 42 and 44, which close and pan along the axis of cage 20. In general, each mold has a cavity machined to form those surfaces of cage 20 that face in the axial direction in which it is pulled. For example, mold 44 would form the balls seats 38, while oppositely withdrawing mold 42 would form the oppositely facing ball contact zones 36. More specifically, FIG. 12 shows certain sections of the molds 42 and 44 broken away to better illustrate the cage surfaces that they form. Mold sections 42' move through the clearance notches 40 as the molds 42, 44 close or part. The semi spherical end of each mold section 42' forms a ball contact zone 36, and its sides form the semi cylindrical finger side surfaces 32 and 34. Oppositely moving mold sections 44' move axially in between the mold sections 42' (from which action the term "axial by pass molding" is derived) to form the ball seats 38. Therefore, even though the three point ball contact created by the ball seats 38 and oppositely facing zones 36 provides a complete, resilient ball retention pocket, the parting of the molds 42 and 44 stresses no part of the ball pocket, as it does with the prior art molded cages discussed above. Therefore, the strength and resilience of the ball pocket is not limited.

In conclusion, a molded plastic cage is provided which does not limit either ball spacing, or cage pocket retention strength, and which can be easily molded, an advantageous combination of features. Variations of the preferred embodiment could be made. A less thick ball seat 38 could, theoretically, have no radial overlap "O" with the contact zones 36, effectively eliminating the clearance slots 40. Such a design would be equally moldable, and less complex, but would not provide pockets that retained the balls 22 as a subassembly separate from the bearing. It would still provide good ball separation and control inside the bearing, however. A different shape for finger 30 could be provided, so long as each pair of adjacent fingers made two of the three points of contact illustrated in FIG. 15. Thus, a differently shaped pair of adjacent fingers that wrapped around the chord length line could still contact the outer surface of the ball generally along the dotted semi circular lines shown less closely and completely than the semi spherical zone 36 illustrated, but would still provide two of the needed three points or areas of contact. Likewise, a less closely conforming ball contact surface than the seat 38 illustrated, which still contacted the outer surface of a ball in the area of the solid line curve shown in FIG. 15, could provide the other of the three points of ball contact. The finger side surfaces 32 and 34 are shown as semi cylindrical, and are so labeled in FIG. 15. They could be simply flat, and still be moldable, and still contact the outside of the balls 22. However, their semi cylindrical shape allows them to provide four points of contact for what can be considered a secondary socket surrounding ball 22, secondary to the socket provided by the three points of the zones 36 and seat 38. This is an additional advantage of the particular embodiment disclosed. Therefore, it will be understood that it is not intended to limit the invention to just the embodiment disclosed.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A moldable, one piece, open profile bearing ball cage for retaining and separating a closely packed complement of bearing balls having a predetermined pitch circle, predetermined chord length lines interconnecting the centers of said balls, and a central axis around which said balls are arrayed, comprising, a generally annular spine concentric to said central axis, a plurality of ball seats integral to said spine and equal in number to said balls, each of said ball seats lying generally on a sphere coextensive with one of said balls, on one side of a plane through said pitch circle, and facing in one axial direction, and, a plurality of generally hook shaped fingers equal in number to said balls plus one and extending in adjacent pairs axially from said spine and wrapping around, and clear of, said chord length lines, each of said fingers having a pair of side surfaces that extend axially and intersect at a ball contact zone located on the opposite side of said pitch plane, facing in the opposite axial direction, and lying generally on a sphere coextensive with one of said balls, said contact zones having no circumferential or radial overlap with said ball seats, whereby, a ball pocket is provided for each ball between each ball seat and respective pair of ball contact zones, with the chord length lines remaining unobstructed by solid cage material, while said cage may also be molded by an axial draw technique.

2. A moldable, one piece, open profile bearing ball cage for retaining and separating a closely packed complement of bearing balls having a predetermined pitch circle, predetermined chord length lines interconnecting the centers of said balls, and a central axis around which said balls are arrayed, comprising, a generally annular spine concentric to said central axis, a plurality of ball seats integral to said spine and equal in number to said balls, each of said ball seats lying generally on a sphere coextensive with one of said balls, on one side of a plane through said pitch circle, and facing in one axial direction, a plurality of generally hook shaped fingers equal in number to said balls plus one and extending in adjacent pairs axially from said spine and wrapping around, and clear of, said chord length lines, each of said fingers having a pair of side surfaces that extend axially and intersect at a ball contact zone located on one side of said pitch plane and lying generally on a sphere coextensive with one of said balls, on the opposite side of said plane, and facing in the opposite axial direction, and, a pair of clearance notches extending axially and separating each of said ball seats from the ball contact zones bordering it so as to provide no circumferential overlap with, while allowing radial overlap between, said ball seat and respective pairs of ball contact zones, whereby, a ball retaining pocket is provided for each ball between each ball seat and respective pair of ball contact zones, with the chord length lines remaining unobstructed by solid cage material, while said cage may also be molded by an axial draw technique.

3. A moldable, one piece, open profile bearing ball cage for retaining and separating a closely packed complement of bearing balls having a predetermined pitch circle, predetermined chord length lines interconnecting the centers of said balls, and a central axis around which said balls are arrayed, comprising, a generally annular spine concentric to said central axis, a plurality of ball seats integral to said spine and equal in number to said balls, each of said ball seats lying generally on a sphere coextensive with one of said balls, on one side of a plane through said pitch circle, and facing in one axial direction, a plurality of generally hook shaped fingers equal in number to said balls plus one and extending in adjacent pairs axially from said spine and wrapping around and clear of said chord length lines, each of said fingers having a pair of semi cylindrical side surfaces that extend axially, and which have a diagonal separation from the side surfaces of adjacent fingers substantially equal to the diameter of a ball, and which intersect at a ball contact zone located on one side of said pitch plane and lying generally on a sphere coextensive with one of said balls, on the opposite side of said plane, and facing in the opposite axial direction, and, a pair of clearance notches extending axially and separating each of said ball seats from the ball contact zones bordering it so as to provide no circumferential overlap with, while allowing radial overlap between, said ball seat and respective pairs of ball contact zones, whereby, a ball retaining pocket is provided for each ball between each ball seat and respective pair of ball contact zones, as well as between each diagonally opposed pair of finger side surfaces, with the chord length lines remaining unobstructed by solid cage material, while said cage may also be molded by an axial draw technique.

* * * * *